(12) United States Patent
Kitatani et al.

(10) Patent No.: US 9,348,442 B2
(45) Date of Patent: May 24, 2016

(54) INPUT APPARATUS

(75) Inventors: Kenichi Kitatani, Kanagawa (JP); Hiroyuki Aoki, Kanagawa (JP); Yumi Katou, Kanagawa (JP); Ayumu Yagihashi, Kanagawa (JP); Atsuhiko Murayama, Kanagawa (JP); Seiji Sugahara, Tokyo (JP)

(73) Assignee: NEC CORPORATION, Tokyo (JP)

(*) Notice: Subject to any disclaimer, the term of this patent is extended or adjusted under 35 U.S.C. 154(b) by 154 days.

(21) Appl. No.: 13/980,206

(22) PCT Filed: Jan. 24, 2012

(86) PCT No.: PCT/JP2012/000436
§ 371 (c)(1),
(2), (4) Date: Jul. 17, 2013

(87) PCT Pub. No.: WO2012/102026
PCT Pub. Date: Aug. 2, 2012

(65) Prior Publication Data
US 2013/0285967 A1  Oct. 31, 2013

(30) Foreign Application Priority Data
Jan. 26, 2011 (JP) .................. 2011-013971

(51) Int. Cl.
*G06F 3/041* (2006.01)
*G06F 3/043* (2006.01)

(52) U.S. Cl.
CPC ............. *G06F 3/041* (2013.01); *G06F 3/043* (2013.01); *G06F 2203/04101* (2013.01)

(58) Field of Classification Search
CPC ............. G06F 3/016; G06F 2203/014; G06F 3/04815; G06F 2203/04101

USPC ................................ 345/156–178
See application file for complete search history.

(56) References Cited

U.S. PATENT DOCUMENTS 5,717,168 A * 2/1998 DeBuisser et al. ......... 178/18.04
2011/0148798 A1* 6/2011 Dahl ........................... 345/173

FOREIGN PATENT DOCUMENTS

CN  1243241 A  2/2000
CN  1543599 A  11/2004

(Continued)

OTHER PUBLICATIONS

Communication dated Aug. 26, 2014, issued by the Japan Patent Office in corresponding Japanese Application No. 2011-013971.

(Continued)

*Primary Examiner* — Amit Chatly
(74) *Attorney, Agent, or Firm* — Sughrue Mion, PLLC (57) ABSTRACT

An input apparatus (for example, a mobile terminal apparatus (100)) includes a display unit (60) that displays a plurality of operation position displays (for example, operation position displays (61 to 66)); and a detection unit that contactlessly detects an operation which corresponds to an operation position set in a specific space of a front of the input apparatus in correspondence to each of the plurality of operation position displays. The detection unit includes a first piezoelectric element (an oscillation piezoelectric element (31)) that oscillates ultrasound toward the front space of the input apparatus; a second piezoelectric element (a reception piezoelectric element (21)) that detects the ultrasound which is oscillated by the first piezoelectric element; and a determination unit that determines whether or not an operation is performed on a certain operation position based on a result of detection performed by the second piezoelectric element.

6 Claims, 9 Drawing Sheets

(56) References Cited

FOREIGN PATENT DOCUMENTS

| JP | 7-282699 A | 10/1995 | | |
|---|---|---|---|---|
| JP | 9-501247 A | 2/1997 | | |
| JP | 2001255993 A | 9/2001 | | |
| JP | 2003-29898 A | 1/2003 | | |
| JP | 2003029898 A * | 1/2003 | ................ | G06F 3/00 |
| JP | 2004-537118 A | 12/2004 | | |
| WO | WO 2009147398 A2 * | 12/2009 | .............. | G06F 3/043 |

OTHER PUBLICATIONS

Communication dated Mar. 10, 2015, issued by the Japan Patent Office in corresponding application No. 2011-013971.

Sadahiro Arai, "Principles of Ultrasound Sensor and How to Use and Choice of the Same: Difference from Photoelectric System?", Robot Shop Technologia WebShop [online], Apr. 27, 2010, [retrieved on Feb. 27, 2015], Retrieved from the Internet, URL:HTTP://www.technologia.co.jp/report20100427.html, Cited in JP Comm. dated Mar. 10, 2015 in 2011-013971.

Communication dated Jun. 23, 2015 from the State Intellectual Property Office of the People's Republic of China in counterpart Application No. 201280006623.9.

Communication dated Dec. 22, 2015, issued by the Japan Patent Office in corresponding Japanese Application No. 2011-13971.

* cited by examiner

INPUT APPARATUS

CROSS REFERENCE TO RELATED APPLICATIONS

This application is a National Stage of International Application No. PCT/JP2012/000436, filed on Jan. 24, 2012, which claims priority from Japanese Patent Application No. 2011-013971, filed on Jan. 26, 2011, the contents of all of which are incorporated herein by reference in their entirety.

TECHNICAL FIELD

The present invention relates to an input apparatus.

BACKGROUND ART

A technology that relates to a touch panel which uses a display screen as an operation unit is disclosed in, for example, Patent Document 1. In the technology disclosed in Patent Document 1, a touch with a finger on a screen is detected using piezoelectric elements.

Meanwhile, Patent Document 2 discloses a technology that provides various tactile sensations to a skin (for example, the tip of a finger) using ultrasound.

RELATED DOCUMENT

Patent Document

[Patent Document 1] Japanese Laid-Open Patent Application No. H07-282699
[Patent Document 2] Japanese Laid-Open Patent Application No. 2003-29898

DISCLOSURE OF THE INVENTION

In a touch panel, a finger, a stylus, or the like directly comes into contact with a screen. Therefore, the screen is stained due to the hand grease, or the imprint of the stylus remains on the screen.

An object of the present invention is to provide an input apparatus which can contactlessly detect an operation corresponding to an operation position display displayed on the screen.

The present invention provides an input apparatus including: a display unit that displays a plurality of operation position displays; and a detection unit that contactlessly detects an operation performed on an operation position which is set in a specific space of a front of the input apparatus, which corresponds to each of the plurality of operation position displays, wherein the detection unit includes a first piezoelectric element that oscillates ultrasound toward the front space of the input apparatus; a second piezoelectric element that detects the ultrasound which is oscillated by the first piezoelectric element; and a determination unit that determines whether or not an operation is performed on a certain operation position based on a result of detection performed by the second piezoelectric element.

According to the present invention, it is possible to contactlessly detect an operation which is performed on an operation position corresponding to an operation position display displayed on the display unit.

BRIEF DESCRIPTION OF THE DRAWINGS

The above-described object, the other objects, features, and advantages will be further apparent with preferred embodiments which will be described below and the accompanying drawings below.

DESCRIPTION OF EMBODIMENTS

Hereinafter, embodiments of the present invention will be described with reference to the accompanying drawings. Meanwhile, the same reference numerals are used for the same components throughout the drawings, and the description thereof will not be repeated.

First Embodiment

Figure 1:
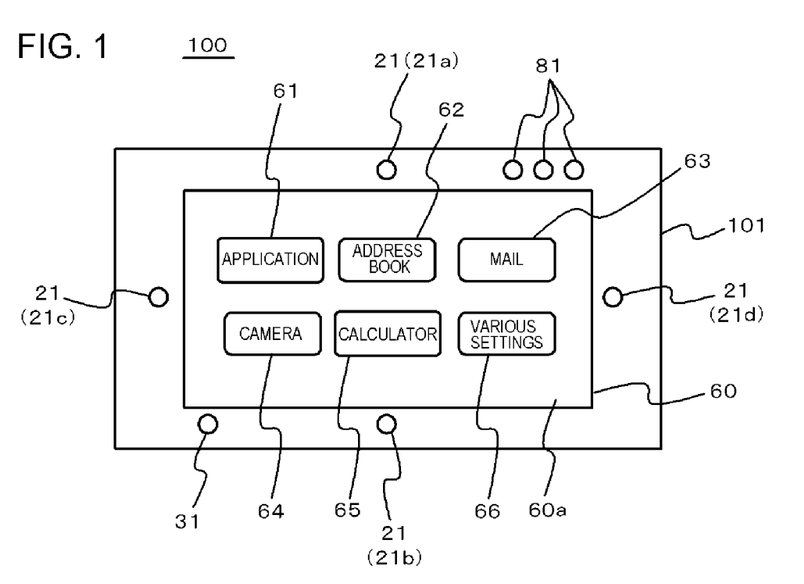
FIG. 1 is a front view showing a mobile terminal apparatus as an input apparatus according to a first embodiment.
Figure 2:
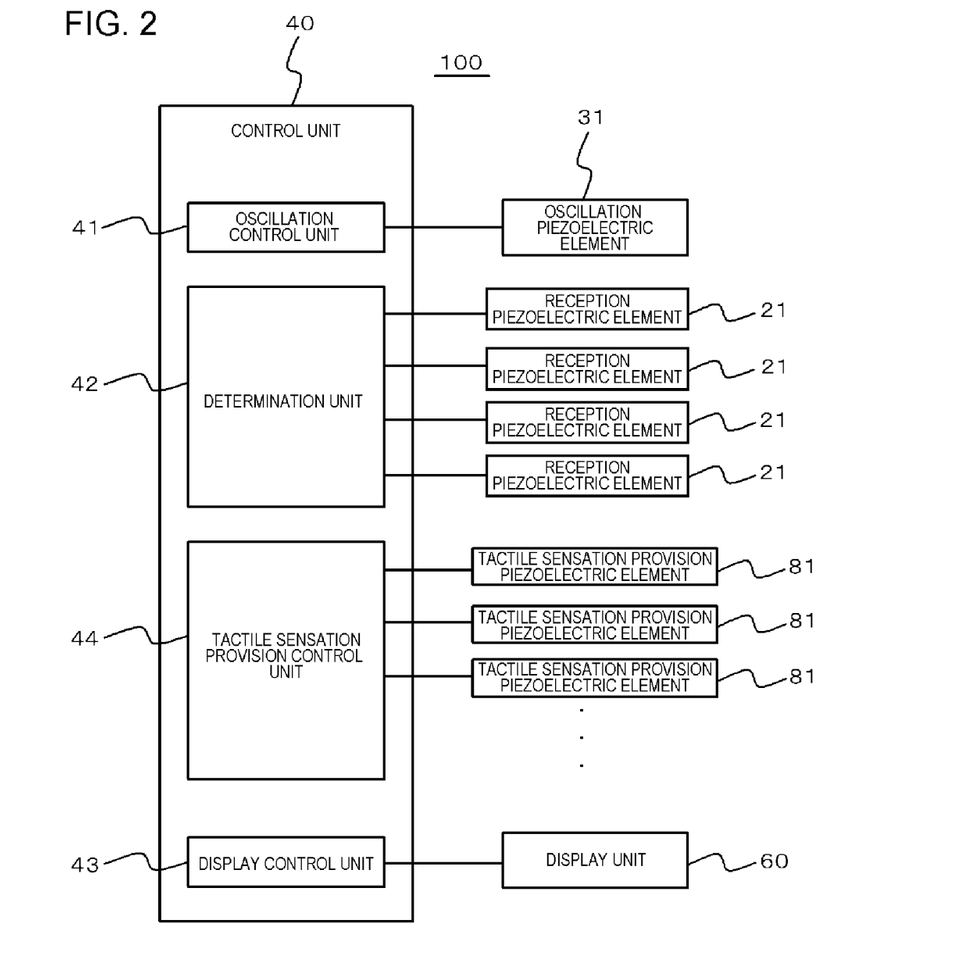
FIG. 2 is a block diagram showing the mobile terminal apparatus in FIG. 1.
Figure 3:
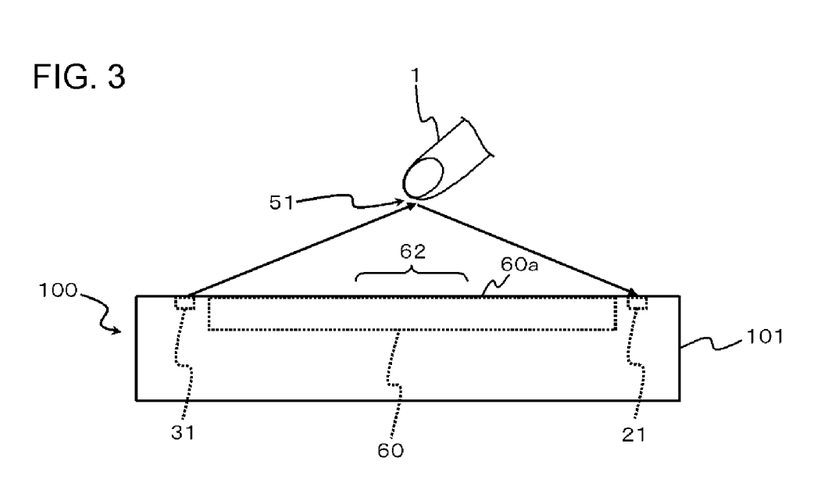
FIG. 3 is a side view showing a state in which an operation is performed on an operation position using a finger.

FIG. 1 is a front view showing a mobile terminal apparatus 100 as an input apparatus according to a first embodiment, FIG. 2 is a block diagram showing the mobile terminal apparatus 100, and FIG. 3 is a side view showing a state in which an operation is performed on an operation position 51 using a finger 1.

The mobile terminal apparatus 100 according to the embodiment includes a display unit 60 which displays a plurality of operation position displays (for example, operation position displays 61 to 66), and a detection unit which contactlessly detects an operation performed on an operation position (an operation position 51 or the like) set in a specific space of the front of the mobile terminal apparatus 100 (for example, the front of the display unit 60) so as to correspond to each of the plurality of operation position displays. The detection unit includes a first piezoelectric element (an oscillation piezoelectric element 31) which oscillates ultrasound toward the front space of the mobile terminal apparatus 100 (for example, the front space of the display unit 60), a second piezoelectric element (a reception piezoelectric element 21) which detects the ultrasound oscillated by the first piezoelectric element, and a determination unit 42 which determines whether or not an operation is performed on a certain operation position based on a result of detection performed by the second piezoelectric element. Meanwhile, the mobile terminal apparatus 100 is, for example, a mobile phone, a Personal Digital Assistant (PDA), a small game device, a laptop-type personal computer, or the like. Hereinafter, the details thereof will be described.

As shown in FIG. 1, the mobile terminal apparatus 100 includes a housing 101, and a display unit 60 which is provided in the housing 101. Meanwhile, although FIG. 1 shows an example in which the mobile terminal apparatus 100 has a tablet form, the mobile terminal apparatus 100 may have other forms. That is, the mobile terminal apparatus 100 may have a folded form including first and second housings which are connected to be mutually foldable, and may have a slide form including first and second housings which are connected to be mutually slidable.

The display unit 60 includes, for example, a liquid crystal display apparatus. The display unit 60 displays various information displays on a display screen 60a thereof. The displays include a plurality of operation position displays (for example, operation position displays 61 to 66). The display screen 60a is formed in, for example, a rectangular form.

The mobile terminal apparatus 100 includes an oscillation piezoelectric element 31 which oscillates ultrasound toward the front space of the mobile terminal apparatus 100, reception piezoelectric elements 21 (21a, 21b, 21c, and 21d) which detect the ultrasound oscillated by the oscillation piezoelectric element 31, and tactile sensation provision piezoelectric elements (the third piezoelectric element) 81 which oscillate the ultrasound toward the operation positions. The oscillation piezoelectric element 31, the reception piezoelectric elements 21, and the tactile sensation provision piezoelectric elements 81 are provided at positions which are adjacent to the display unit 60 in the housing 101.

The mobile terminal apparatus 100 includes at least one of the oscillation piezoelectric element 31 or the reception piezoelectric element 21 in plural. In a case of the embodiment, for example, the mobile terminal apparatus 100 includes a plurality of reception piezoelectric elements 21. For example, the reception piezoelectric elements 21 are arranged at positions corresponding to four sides of the display screen 60a, respectively. In addition, for example, the mobile terminal apparatus 100 includes a plurality of tactile sensation provision piezoelectric elements 81.

As shown in FIG. 2, the mobile terminal apparatus 100 includes a control unit 40 in addition to the oscillation piezoelectric element 31, the reception piezoelectric elements 21, the tactile sensation provision piezoelectric elements 81, and the display unit 60.

The control unit 40 includes an oscillation control unit 41 which controls the operation of the oscillation piezoelectric element 31, the determination unit 42, a display control unit 43 which controls the operation of the display unit 60, and a tactile sensation provision control unit 44 which controls the operations of the tactile sensation provision piezoelectric elements 81.

It is possible to oscillate the ultrasound from the oscillation piezoelectric element 31 in such a way that the oscillation control unit 41 controls the oscillation piezoelectric element 31.

The ultrasound oscillated by the oscillation piezoelectric element 31 is detected by each of the reception piezoelectric elements 21. Each of the reception piezoelectric elements 21 detects ultrasound having a frequency which is oscillated by the oscillation piezoelectric element 31. It is preferable that the resonance frequency of each of the reception piezoelectric elements 21 be matched with the oscillating frequency of the oscillation piezoelectric element 31.

A result of detection obtained by each of the reception piezoelectric elements 21 is input to the determination unit 42.

The determination unit 42 determines whether or not an operation is performed on a certain operation position based on the result of the detection obtained by each of the reception piezoelectric elements 21.

It is possible to provide tactile sensation to an object (for example, a finger 1 (FIG. 3), a stylus (not shown in the drawing), or the like) which performs an operation in such a way that the tactile sensation provision control unit 44 controls each of the tactile sensation provision piezoelectric elements 81 and ultrasound is oscillated toward the operation position from each of the tactile sensation provision piezoelectric elements 81.

As shown in FIG. 3, the operation position is separated from the display screen 60a. For example, the operation position is set to the front space of each of the operation position displays 61 to 66. In FIG. 3, a state in which an operation is performed using the finger 1 on an operation position 51 corresponding to the operation position display 62 is shown as an example.

The ultrasound, which is output from the oscillation piezoelectric element 31, is reflected by the finger 1 and then detected by each of the reception piezoelectric elements 21, and the intensity of the ultrasound which is reflected toward each of the reception piezoelectric elements 21 differs depending on the position of the finger 1. That is, the result of detection obtained by each of the reception piezoelectric elements 21 differs depending on whether or not an operation is performed on a certain operation position. Therefore, it is possible to determine whether or not an operation is performed on a certain operation position by analyzing the result of detection obtained by each of the reception piezoelectric elements 21 using the determination unit 42. That is, it is possible to contactlessly detect an operation which is performed on the operation position corresponding to each of the operation position displays.

Meanwhile, in order to implement such a detection operation, for example, the determination unit 42 stores a detection value for each operation position, obtained by each of the reception piezoelectric elements 21, as a table in advance. Further, the determination unit 42 extracts an operation position corresponding to the detection value obtained by each of the reception piezoelectric elements 21 from the table, and determines that an operation corresponding to the operation position is performed.

Otherwise, the determination unit 42 may determine whether or not an operation is performed on a certain operation position by performing a calculation using a value detected by each of the reception piezoelectric elements 21. For example, an operation position may be specified by determining the vertical position of the operation position based on a ratio of a detection value obtained by a reception piezoelectric element 21a which is located over the display screen 60a to a detection value obtained by a reception piezoelectric element 21b which is located under the display screen 60a, and by determining the horizontal position of the operation position based on a ratio of a detection value obtained by a reception piezoelectric element 21c which is located on the left of the display screen 60a to a detection value obtained by a reception piezoelectric element 21d which is located on the right of the display screen 60a.

Meanwhile, it is preferable that each of the operation positions be located in the same plane, and thus a user easily performs an operation. In addition, it is preferable that a distance from the display screen 60a to each of the operation positions be equal to or less than 5 cm (further preferably, equal to or less than 3 cm), and thus the detection of an operation can be performed with higher precision.

In addition, when it is determined that an operation is performed on a certain operation position by the determination unit 42, the tactile sensation provision control unit 44 provides tactile sensation to the finger 1 by controlling the tactile sensation provision piezoelectric elements 81 and applying the ultrasound to the finger 1. Here, it is possible to control a position to provide tactile sensation to the finger 1 or the like by controlling a value of the phase of ultrasound oscillated from each of the tactile sensation provision piezoelectric elements 81 (or a value of the amount of relative shift of the phase of the ultrasound oscillated from each of the tactile sensation provision piezoelectric elements 81). Therefore, in the embodiment, the value of the phase of the ultrasound oscillated from each of the tactile sensation provision piezoelectric elements 81 or the amount of relative shift of the ultrasound are controlled such that tactile sensation can be provided at the operation position in which the operation is detected.

Further, it is possible to provide a plurality of kinds of tactile sensation (for example, solid tactile sensation, soft tactile sensation, rough tactile sensation, smooth tactile sensation, uneven tactile sensation, and the like) by controlling the amplitude of the ultrasound which is oscillated from each of the tactile sensation provision piezoelectric elements 81 and a value of phase (or the amount of relative shift of the phase) of the ultrasound which is oscillated from each of the tactile sensation provision piezoelectric elements 81.

In addition, when it is determined that an operation is performed on a certain operation position by the determination unit 42, the control unit 40 performs the other processes corresponds to the operation. For example, as shown in FIG. 1, the operation position displays 61 to 66 include the operation position display 61 which indicates an operation position (not shown) indicating the start of an application, the operation position display 62 which indicates an operation position 51 indicating the start of an address book, the operation position display 63 which indicates an operation position (not shown) indicating the start of an electronic mail function, the operation position display 64 which indicates an operation position (not shown) indicating the start of a camera function, the operation position display 65 which indicates an operation position (not shown) indicating the start of a calculator function, and the operation position display 66 which indicates an operation position (not shown) indicating the start of various setting functions. The control unit 40 performs processes correspond to the functions.

Figure 4:
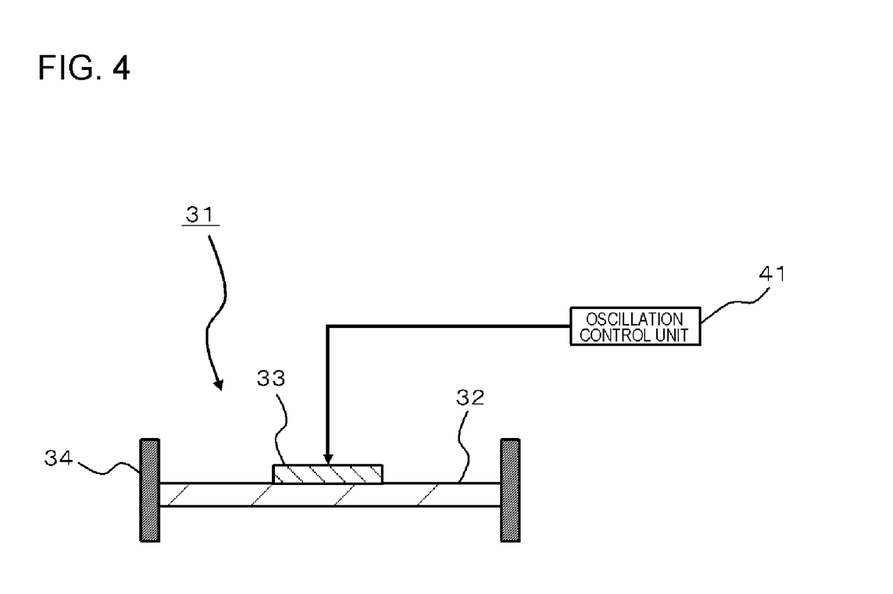
FIG. 4 is a schematic diagram showing an oscillation piezoelectric element included in the mobile terminal apparatus shown in FIG. 1.

FIG. 4 is a pattern diagram showing the oscillation piezoelectric element 31.

The oscillation piezoelectric element 31 includes, for example, a sheet-shaped vibration member 32, an oscillator 33, and a support member 34. The oscillator 33 is, for example, a piezoelectric oscillator and is attached to one side surface of the vibration member 32. The support member 34 supports the edge of the vibration member 32. In addition, the support member 34 is fixed to, for example, the circuit substrate (not shown) or the housing 101 of the mobile terminal apparatus 100.

The oscillation control unit 41 configures an oscillation circuit which vibrates the oscillator 33 by inputting an oscillation signal to the oscillator 33 and oscillates sound waves from the oscillator 33 and the vibration member 32.

The vibration member 32 vibrates based on vibration which is generated from the oscillator 33, and oscillates sound waves which have, for example, a frequency equal to or more than 20 kHz. Meanwhile, the oscillator 33 oscillates sound waves which have, for example, a frequency equal to or more than 20 kHz by vibrating itself. In addition, the vibration member 32 adjusts the fundamental resonance frequency of the oscillator 33. The fundamental resonance frequency of a mechanical oscillator depends on load weight and compliance. Since the compliance is a mechanical rigidity of a oscillator, it is possible to control the fundamental resonance frequency of the oscillator 33 by controlling the rigidity of the vibration member 32. Meanwhile, it is preferable that the thickness of the vibration member 32 be equal to or greater than 5 μm and equal to or less than 500 μm. In addition, it is preferable that the vibration member 32 have a longitudinal elastic modulus which is an index of rigidity and which is equal to or greater than 1 GPa and equal to or less than 500 GPa. When the rigidity of the vibration member 32 is too low or too high, there is a possibility that features or reliability as the mechanical oscillator may be damaged. Meanwhile, although a material which configures the vibration member 32 is not particularly limited if the material has a high elastic modulus with regard to the oscillator 33 which is formed of a brittle material, such as metal, resin, or the like, it is preferable that the material be phosphor bronze or stainless from a viewpoint of workability or cost.

In the embodiment, the planar shape of the oscillator 33 is a circular shape. However, the planar shape of the oscillator 33 is not limited to the circular shape. The entire surface of a surface of the oscillator 33 which faces the vibration member 32 is fixed to the vibration member 32 by adhesive. Therefore, the entire surface of one surface of the oscillator 33 is restricted by the vibration member 32.

The oscillation control unit 41 generates an electrical signal which is input to the oscillator 33, that is, the modulation signal of the oscillation piezoelectric element 31. The carrier wave of the modulation signal is ultrasound which has a frequency of, for example, equal to or more than 20 kHz, and, specifically, is an ultrasound of, for example, 100 kHz. The oscillation control unit 41 controls the oscillation piezoelectric element 31 such that predetermined oscillation output is made.

Figure 5:
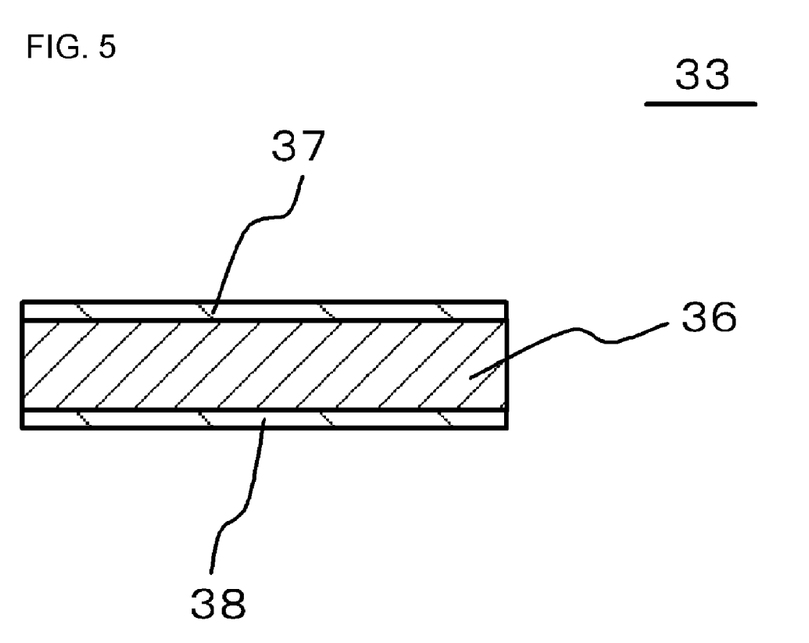
FIG. 5 is a cross-sectional view showing the layered structure of an oscillator.

FIG. 5 is a cross-sectional view showing the layered structure of the oscillator 33 in the thickness direction. The oscillator 33 includes a piezoelectric body 36, atop electrode 37, and a bottom electrode 38.

The piezoelectric body 36 is polarized in the thickness direction. If a material which configures the piezoelectric body 36 is a material which has a piezoelectric effect, either an inorganic material or an organic material may be used. However, a material which has high electromechanical conversion efficiency, for example, lead zirconate titanate (PZT) or barium titanate ($BaTiO_3$) is preferable. A thickness h1 of the piezoelectric body 36 is, for example, equal to or greater than 10 μm and equal to or less than 1 mm. When the thickness h1 is less than 10 μm, there is a possibility that the oscillator 33 may be damaged when the oscillation piezoelectric element 31 is manufactured. In addition, when the thickness h1 is greater than 1 mm, the electromechanical conversion efficiency becomes extremely low, and thus there is a possibility that a sufficient large vibration cannot be obtained. The reason for this is that, if the thickness of the oscillator 33 increases, electric field strength in the piezoelectric oscillator is inversely proportional thereto and decreases.

Although a material which configures the top electrode 37 and the bottom electrode 38 is not particularly limited, for example, silver or silver/palladium can be used. Since silver is used as a low-resistance and general electrode material, there are advantages in a manufacturing process and costs. Since the silver/palladium is a low-resistance material which excels in oxidation resistance, there is an advantage in terms of reliability. In addition, although a thickness h2 of the top electrode 37 and the bottom electrode 38 is not particularly limited, it is preferable that the thickness h2 be equal to or greater than 1 μm and equal to or less than 50 μm. When the thickness h2 is less than 1 μm, it is difficult to uniformly form the top electrode 37 and the bottom electrode 38. As a result, there is a possibility that the electromechanical conversion efficiency may be lowered. In addition, when the film thickness of the top electrode 37 and the bottom electrode 38 exceed 100 μm, the top electrode 37 and the bottom electrode 38 become restriction surfaces with regard to the piezoelectric body 36, and thus there is a possibility that energy conversion efficiency may be lowered.

The oscillator 33 can have an outside diameter of φ18 mm, an inside diameter of φ12 mm, and a thickness of 100 μm. In addition, as the top electrode 37 and the bottom electrode 38, for example, an silver/palladium alloy (a ratio by weight is, for example, 7:3) which has a thickness of 8 μm can be used. In addition, the vibration member 32 can use phosphor bronze which has an outside diameter of φ20 mm and a thickness of 50 μm (0.3 mm). The support member 34 functions as a casing of the oscillation piezoelectric element 31, and is formed in a tubular shape (for example, cylindrical shape) which has, for example, an outer diameter of φ22 mm and an inner diameter of φ20 mm.

Figure 6:
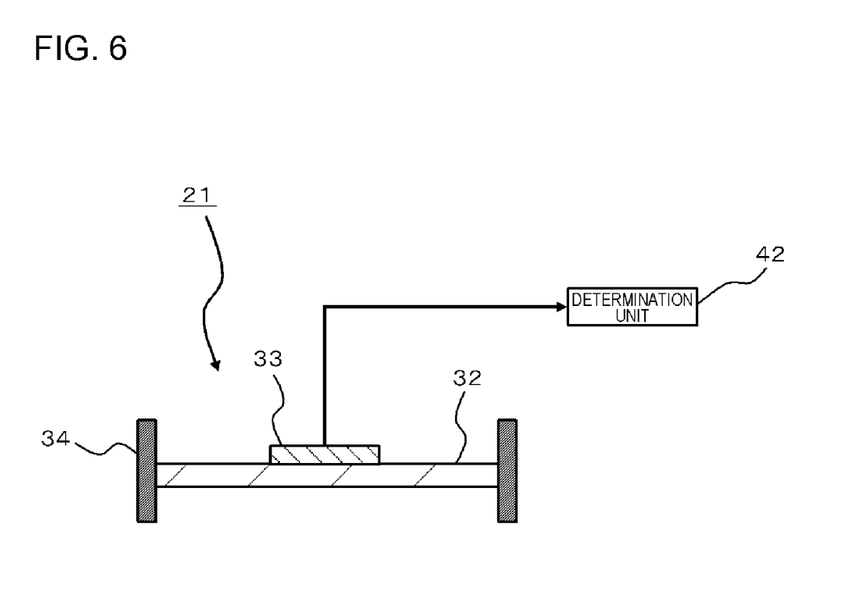
FIG. 6 is a schematic diagram showing a reception piezoelectric element included in the mobile terminal apparatus shown in FIG. 1.

FIG. 4 is a pattern diagram showing the reception piezoelectric element 21.

The reception piezoelectric element 21 is configured as the same as the oscillation piezoelectric element 31. The oscillator 33 of each reception piezoelectric element 21 individually generates an electrical signal based on receiving ultrasound, and outputs the electrical signal to the determination unit 42 (as a result of the detection of the ultrasound).

The determination unit 42 determines whether or not an operation is performed on a certain operation position based on the electrical signal which is input from each reception piezoelectric element 21.

As described above, the oscillation piezoelectric element 31 has a function as a speaker which outputs ultrasound, and the reception piezoelectric element 21 functions as a microphone which detects the ultrasound.

In addition, although not shown in the drawing, the tactile sensation provision piezoelectric element 81 and the tactile sensation provision control unit 44 are configured the same as the oscillation piezoelectric element 31 and the oscillation control unit 41.

Hereinbefore, the detection unit, which contactlessly detects an operation performed on an operation position corresponding to each operation position display, includes the oscillation control unit 41, the oscillation piezoelectric element 31, the reception piezoelectric element 21, and the determination unit 42.

Subsequently, a series of operations will be described.

Figure 7:
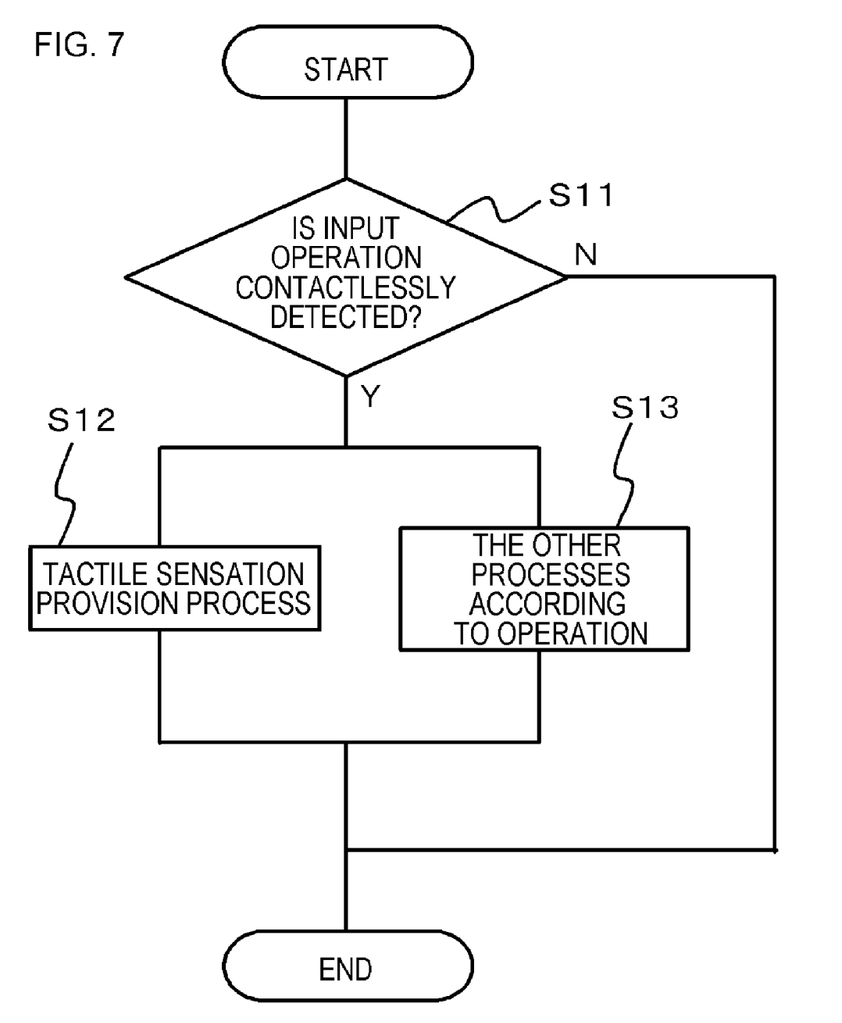
FIG. 7 is a flowchart showing the flow of an operation according to the first embodiment.

FIG. 7 is a flowchart showing the flow of an operation according to the first embodiment. The mobile terminal apparatus 100 repeatedly performs a process in FIG. 7 for every predetermined time.

First, a user performs an operation on a certain operation position (the operation position 51 or the like) of the operation positions which are indicated by the plurality of operation position displays 61 to 66. That is, the finger 1 is moved to a desired operation position. Then, the detection unit detects the operation (Y in step S11).

Subsequently, a process to provide tactile sensation to the finger 1 is performed by the tactile sensation provision control unit 44 (step S12).

In addition, in parallel with step S12 (following step S12), a process in step S13 is performed. In step S13, the other processes (processes excepting the process in step S12) according to the operation are performed. Specifically, for example, processes to start the application, the address book, the electronic mail function, the camera function, the calculator function, or the various setting functions are performed.

According to the above-described first embodiment, it is possible to contactlessly detect operations performed on the operation positions (the operation position 51 and the like) which are indicated by the operation position displays 61 to 66 displayed on the display unit 60.

Therefore, unlike a touch panel which causes a finger, a stylus, or the like to touch to a screen directly, it is possible to restrain the screen from be staining due to the hand grease or the like, or the imprint of a stylus from remaining on the screen.

In addition, since at least one of the oscillation piezoelectric element 31 and the reception piezoelectric elements 21 (for example, the reception piezoelectric elements 21) is configured in plural, it is possible to easily detect the respective operations performed on the operation positions which are 2-dimensionally arranged in a plurality of positions.

More specifically, at least one of the oscillation piezoelectric element 31 and the reception piezoelectric elements 21 (for example, the reception piezoelectric elements 21) is arranged at positions corresponding to the four sides of the display unit 60, and thus it is possible to easily detect the respective operations performed on the operation positions which are 2-dimensionally arranged in the plurality of positions.

In addition, the tactile sensation provision piezoelectric elements 81 which oscillate ultrasound toward the operation positions, and a tactile sensation provision control unit 44 which performs control such that tactile sensation is provided to the object (the finger 1 or the like) which performed an operation using the tactile sensation provision piezoelectric elements 81 using the ultrasound are included. Therefore, since it is possible to provide sensation as if touching the operation position even when an operation performed on the display screen 60a is contactlessly detected, the user can easily recognize that the operation is performed.

In addition, since it is possible to easily adjust a position where the tactile sensation is provided to the object in such a way that tactile sensation is provided using the plurality of tactile sensation provision piezoelectric elements 81, it is possible to provide tactile sensation to the operation position.

Second Embodiment

Figure 8:
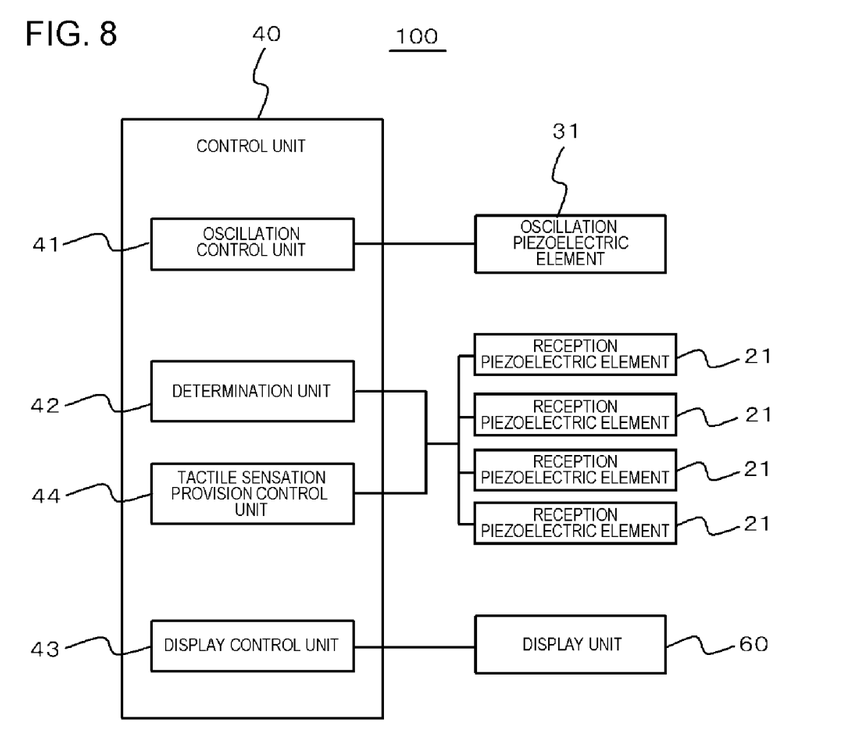
FIG. 8 is a block diagram showing a mobile terminal apparatus as an input apparatus according to a second embodiment.

FIG. 8 is a block diagram showing the mobile terminal apparatus 100 as an input apparatus according to a second embodiment. Although the example in which tactile sensation is provided using the tactile sensation provision piezoelectric elements 81 has been described in the first embodiment, tactile sensation is provided using at least one piezoelectric element (for example, the reception piezoelectric element 21) of the oscillation piezoelectric element 31 and the reception piezoelectric elements 21 in the second embodiment. More specifically, it is possible to use the reception piezoelectric element 21 for both operation detection and tactile sensation provision by shifting timing that an operation is detected using the reception piezoelectric element 21 and timing that the tactile sensation is provided using the reception piezoelectric elements 21 (by performing time division).

In a case of the embodiment, each of the reception piezoelectric elements 21 oscillates ultrasound under the control of the tactile sensation provision control unit 44, and provides tactile sensation to the finger 1 or the like using the ultrasound.

According to the second embodiment, the same advantages as those of the first embodiment can be obtained.

In addition, tactile sensation is provided using ultrasound to the object (for example, the finger 1) which performed an operation using at least one piezoelectric element of the oscillation piezoelectric element 31 and the reception piezoelectric elements 21. Therefore, it is possible to restrain the size of the mobile terminal apparatus 100 from being increased by using the piezoelectric element in both the detection and the tactile sensation provision.

Third Embodiment

Figure 9:
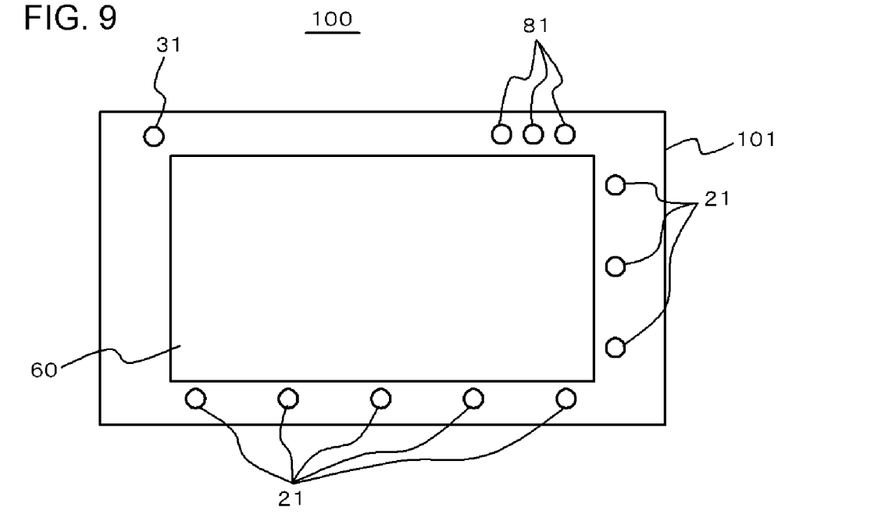
FIG. 9 is a front view showing a mobile terminal apparatus as an input apparatus according to a third embodiment.

FIG. 9 is a front view showing the mobile terminal apparatus 100 as an input apparatus according to a third embodiment. In the first embodiment, an example, in which the reception piezoelectric elements 21 are arranged along the respective four sides of the display unit 60, has been described. In contrast, in the third embodiment, the plurality of reception piezoelectric elements 21 are arranged along each of two sides of the display unit 60 as shown in FIG. 9. According to the third embodiment, the same advantages as that of the first embodiment or the second embodiment can be obtained.

Meanwhile, although the example in which the input apparatus is a mobile terminal apparatus has been described in each of the embodiments, the input apparatus may be an installation type apparatus such as an Automated Teller Machine (ATM) or the like.

In addition, the input apparatus may be provided with a plurality of oscillation piezoelectric elements 31.

In addition, the tactile sensation provision control unit 44 may control the tactile sensation provision piezoelectric elements 81 (or the oscillation piezoelectric element 31 or the reception piezoelectric elements 21) such that tactile sensation becomes strong as the position of the object which performed an operation becomes close to the surface which includes the display unit 60 (the display screen 60*a*). For this, the determination unit 42 determines the distance between the object which performed the operation and the surface which includes the display unit 60 (the display screen 60*a*) based on the result of detection performed by the reception piezoelectric elements 21. Further, the tactile sensation provision control unit 44 controls the tactile sensation provision piezoelectric elements 81 (or the oscillation piezoelectric element 31 or the reception piezoelectric elements 21) such that the tactile sensation becomes strong as the determined distance is close.

This application claims a right of priority based on Japanese Patent Application No. 2011-013971 which is applied on Jan. 26, 2011, and involves all of the disclosure herein.

The invention claimed is:

1. An input apparatus comprising:
a display unit that displays a plurality of operation position displays; and
a detection unit that contactlessly detects an operation performed on an operation position which is set in a specific space of a front of the input apparatus, which corresponds to each of the plurality of operation position displays,
wherein the detection unit includes
a first piezoelectric element that oscillates ultrasound toward the front space of the input apparatus;
a second piezoelectric element that detects the ultrasound which is oscillated by the first piezoelectric element; and
a determination unit that determines whether or not an operation is performed on a certain operation position based on a result of detection performed by the second piezoelectric element, wherein
a tactile sensation provision control unit that performs control such that tactile sensation is provided using a second ultrasound to an object which performed the operation using the second piezoelectric element,
wherein the second piezoelectric element is configured to generate the second ultrasound at a time other than when the second piezoelectric element detects the ultrasound.

2. The input apparatus according to claim 1,
wherein at least one of the first piezoelectric element and the second piezoelectric element is in plural.

3. The input apparatus according to claim 2,
wherein the display unit has a rectangular shape, and
wherein at least one of the first piezoelectric element and the second piezoelectric element is arranged in each of positions which corresponds to one of four sides of the display unit.

4. The input apparatus according to claim 2,
wherein the second piezoelectric element is in plural.

5. The input apparatus according to claim 1,
wherein a distance from the display unit to the specific space is equal to or less than 5 cm.

6. The input apparatus according to claim 1,
wherein the input apparatus is a mobile terminal apparatus.

* * * * *